Inventor:
Elof K. Karlsson

United States Patent Office 2,747,578
Patented May 29, 1956

2,747,578

CONTROLLED MOVEMENT FOR THE KNIVES IN A COMBINATION CANE STALK CUTTER AND LEAF STRIPPER

Elof K. Karlsson, Moline, Ill., assignor to International Harvester Company, a corporation of New Jersey Continuation of application Serial No. 192,744, October 28, 1950. This application October 19, 1954, Serial No. 463,297

3 Claims. (Cl. 130—31)

This invention relates to a new and improved controlled movement for the knives in a combination cane stalk cutter and leaf stripper and is a continuation of my copending application for patent entitled Controlled Movement for the Knives in a Combination Cane Stalk Cutter and Leaf Stripper, filed October 28, 1950, and having Serial No. 192,744, now abandoned.

The present invention relates to a device for controlling the path of movement of combination stalk cutter and leaf stripper knives such as set forth in the patents of Stuart D. Pool, 2,723,667 and 2,723,668.

The principal object of this invention is to pass combination stalk cutter and leaf stripper knives through the juncture between a pair of cooperative leaf stripping rolls in a parallel manner with constant velocity at all points of the cutting edges so that the knife blade simultaneously enters the juncture between the rolls throughout its full length.

An important object of this invention is to provide means for controlling the path of travel of a plurality of knives operating in conjunction with leaf stripping rolls in such a manner that the knives at all times lie parallel to the leaf stripping rolls and cleanly cut the cane stalks into short lengths.

Another important object of this invention is the provision of a mechanical movement for knives to efficiently and uniformly cut a plurality of cane stalks into short lengths and simultaneously remove all the leaves and trash accompanying the cane stalks.

Other and further important objects of this invention will become apparent in the following specification and accompanying drawing.

Figure 1:
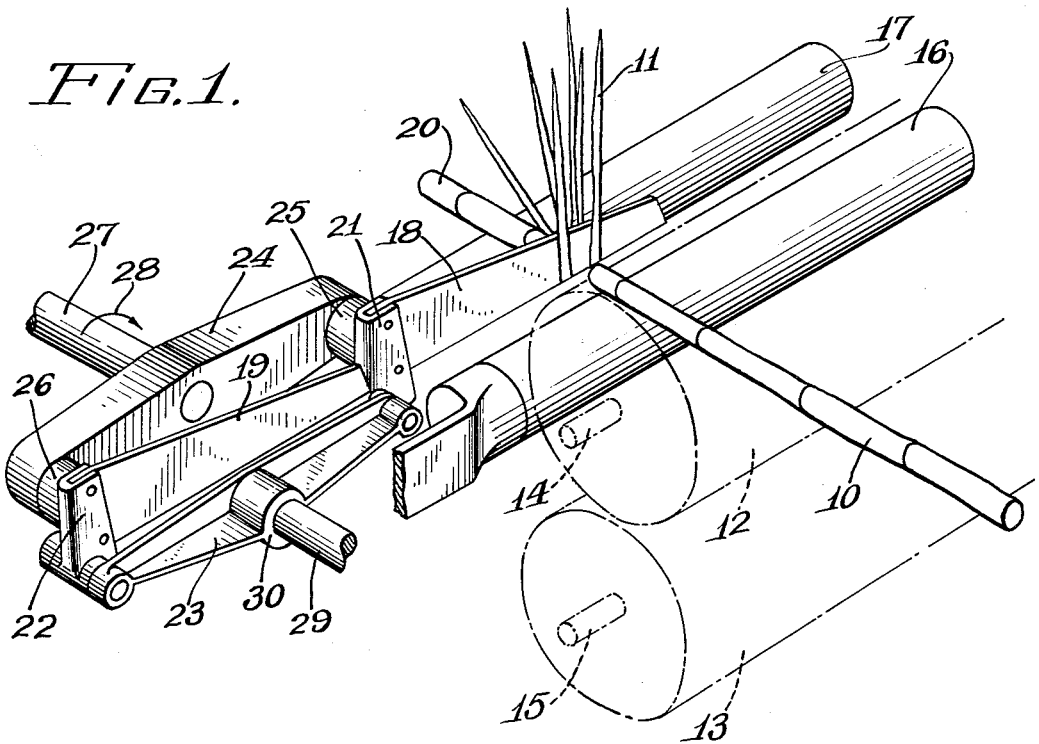
Fig. 1 is a perspective view showing the path controlled cane cutting and leaf stripping knives of this invention.

Reference numeral 10 indicates generally a cane stalk or the like having leaves 11 thereon. The stalks are fed to the cutter and stripper by means of vertically disposed cooperative feeding rolls 12 and 13 mounted on shafts 14 and 15. The stalks 10 are fed rearwardly to a position over cooperative stripping rolls 16 and 17 which are slightly longitudinally spaced apart to permit passage therethrough of knife members 18 and 19. As shown in the Pool patents mentioned above, the knives passing through the juncture between the stripping rolls 16 and 17 are for the purpose of simultaneously cutting the stalks 10 into short lengths designated by the numeral 20 and stripping the leaves 11 from the stalks by propelling the leaves downwardly between the stripping rolls 16 and 17.

As stated above, it is the object of the present invention to provide for parallel movement of the knives 18 and 19 down and through the rolls 16 and 17 insuring simultaneous cutting of stalks throughout the length of the rolls 16 and 17. It should be noted that, as in the copending Pool applications, the knife mechanism is duplicated on the other side of the rolls 16 and 17 so that knives will pass through the entire length of the stripping rolls. The knife blades 18 and 19 are carried on vertically disposed parallel links 21 and 22 respectively. The lower ends of the links 21 and 22 are joined by a link arm 23. The upper ends of the arms 21 and 22 are joined by a link arm 24 by means of connecting or spacer pins 25 and 26. The pins 25 and 26 are sufficiently long so that the links 21, 22, and 23, all lying in a single plane, are offset but parallel to the link 24. The structure just described is a parallelogram linkage in which the member 24 may be considered the first link, and the member 23 considered the second link lying opposite and parallel to the first link 24. The members 21 and 22 shall be considered the third and fourth parallel links, respectively, joining the adjacent ends of the first and second links. A shaft 27 is provided centrally of the connecting arm 24 and is adapted to be rotatably driven in the direction of rotation indicated by the arrow 28. The connecting arms 23 and 24 lie parallel one to the other and with the vertically disposed parallel links 21 and 22 constitute a parallelogram which accomplishes the proper guided movement of the knives 18 and 19. This parallelogram may be termed generally the means associated with the rotatable structure and the knife arms for controlling the path of movement of the knife arms.

In operation, unstripped cane stalks are fed to the feed rolls 12 and 13 whereupon the feed rolls deliver the stalks at a constant rearward speed to a position over the stripping rolls 16 and 17. Thus the driving of the shaft 27 in a rotary direction, as indicated by the arrow 28, causes rotation of the connecting arm 24 and simultaneous downward movement of the knife arm 18 in which the arm 18 remains parallel to the stripping rolls 16 and 17 at all times thus insuring a constant velocity of the knife as it passes through the juncture of the stripping rolls to thereupon efficiently and cleanly cut the cane stalks into short lengths 20 and strip the leaves and other trash material without cutting this trash. This is accomplished by bending and pushing the leaves and trash downwardly into and through the cooperative rolls 16 and 17. A fixed shaft 29 provides a stationary support about which a sleeve-like bearing 30 is journally mounted. The bearing 30 is located at a position centrally of and intermediate the ends of the link member 23. The fixed shaft 29 about which the bearing 30 freely rotates thus insures that the relative positions of the driving shaft 27 and the shaft 29 shall remain fixed. The several links thus constitute a rotatable structure and more particularly a rotatable parallelogram for the purpose of guiding the path of movement of the cutting blades 18 and 19.

Figure 2:
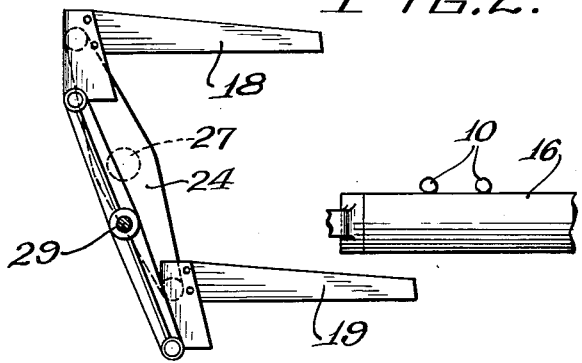
Fig. 2 is an end elevational view of the device as shown in Fig. 1.
Figure 3:
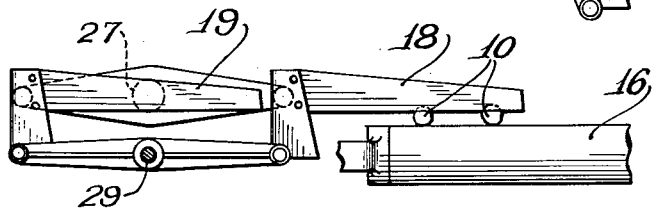
Fig. 3 is an end view similar to Fig. 2 with the knives in a moved position.

As shown in Fig. 2, the knife 18 is progressing inwardly and downwardly by reason of the rotation of the parallelogram on which the knife blade 18 is mounted and the blade 19 is similarly being retracted from the bottom of the cooperative rolls 16 and 17. In Fig. 3 the knife blade 18 has progressed to a position immediately above and still parallel to the rolls 16 and 17 and lying evenly over several cane stalks 10 in position over the rolls 16 and 17. Obviously the stalks 10 will be cleanly and evenly cut, and any leaves and trash thereon will be fed to a position where the rolls 16 and 17 may discharge it downwardly and out through the bottom thereof. The path of movement of the knives 18 and 19 remains constantly horizontal and parallel to the stripping rolls 16 and 17 throughout all their path of movement.

Numerous details of construction may be varied throughout a wide range without departing from the principles disclosed herein, and I therefore do not propose limiting the patent granted hereon otherwise than as necessitated by the appended claims.

What is claimed is:

1. A knife arm having a substantially straight knife edge for use in conjunction with a cane treating machine having cooperative rolls rotating inwardly toward each other and forming a downwardly moving surface therebetween, comprising a rotatable structure, said knife arm fixed to said rotatable structure and adapted to be moved downwardly through the juncture between the cooperative rolls, and parallogram linkage means associated with the rotatable structure and said knife arm for controlling the path of movement of said knife arm to accomplish a constant velocity of all points of said knife arm and a parallel positioning of said straight knife edge with respect to said cooperative rolls at all positions thereof.

2. Knife arms having substantially straight knife edges for use in conjunction with a cane treating machine having cooperative rolls rotating inwardly toward each other and forming a downwardly moving surface therebetween, comprising a rotatable structure, said knife arms fixed to said rotatable structure and adapted to be moved downwardly through the juncture between the cooperative rolls, and means associated with the rotatable structure and said knife arms for controlling the path of movement of said knife arms, said rotatable structure comprising a parallelogram linkage, a pair of spaced apart fixed shafts having their axes parallel and out of alignment with each other, a first link of said parallelogram linkage being rotated intermediate its ends on one of said shafts, a second link opposite and parallel to said first link journaled for pivotal rotation intermediate its ends about the other of said shafts, third and fourth parallel links joining the adjacent ends of said first and second links, and one of said knife arms fixed to each of said third and fourth links whereby the knife arms move throughout a path in which each position of the knife edges of the knife arms is parallel to any other position of the knife edges.

3. A device as set forth in claim 2 in which the second, third and fourth links lie in a plane offset from said first link.

No references cited.